US011958955B2

(12) United States Patent
Olang

(10) Patent No.: US 11,958,955 B2
(45) Date of Patent: Apr. 16, 2024

(54) HYBRID POLYURETHANE SPRAY FOAMS MADE WITH URETHANE PREPOLYMERS AND RHEOLOGY MODIFIERS

(71) Applicant: Owens Corning Intellectual Capital, LLC, Toledo, OH (US)

(72) Inventor: Fatemeh Nassreen Olang, Granville, OH (US)

(73) Assignee: Owens Corning Intellectual Capital, LLC, Toledo, OH (US)

(*) Notice: Subject to any disclaimer, the term of this patent is extended or adjusted under 35 U.S.C. 154(b) by 0 days.

(21) Appl. No.: 17/946,581

(22) Filed: Sep. 16, 2022

(65) Prior Publication Data
US 2023/0086924 A1 Mar. 23, 2023

Related U.S. Application Data

(63) Continuation of application No. 13/346,833, filed on Jan. 10, 2012, now abandoned.

(60) Provisional application No. 61/433,561, filed on Jan. 18, 2011.

(51) Int. Cl.
C08G 59/50 (2006.01)
C08J 9/00 (2006.01)
C08J 9/14 (2006.01)
C08L 63/00 (2006.01)
C08L 75/16 (2006.01)

(52) U.S. Cl.
CPC .............. *C08J 9/146* (2013.01); *C08G 59/50* (2013.01); *C08J 9/0066* (2013.01); *C08L 63/00* (2013.01); *C08L 75/16* (2013.01); *C08J 2207/04* (2013.01); *C08J 2375/04* (2013.01); *C08J 2375/16* (2013.01)

(58) Field of Classification Search
CPC .................................................. C08J 2207/04
See application file for complete search history.

(56) References Cited

U.S. PATENT DOCUMENTS

| | | | |
|---|---|---|---|
| 3,984,360 A | 10/1976 | Galbreath et al. | |
| 4,094,842 A | 6/1978 | Wenzel et al. | |
| 4,725,628 A | 2/1988 | Garvey et al. | |
| 4,845,133 A | 7/1989 | Priester, Jr. et al. | |
| 4,945,120 A | 7/1990 | Kopp et al. | |
| 5,095,069 A | 3/1992 | Ambrose et al. | |
| 5,175,231 A | 12/1992 | Rappoport et al. | |
| 5,232,996 A * | 8/1993 | Shah | C09J 163/00 528/123 |
| 5,254,611 A | 10/1993 | McDermott | |
| 5,444,099 A | 8/1995 | Abe et al. | |
| 6,465,539 B1 | 10/2002 | Weikard et al. | |
| 6,646,153 B1 | 11/2003 | Huybrechts | |
| 6,829,362 B1 | 12/2004 | Kadziela et al. | |
| 6,943,201 B2 | 9/2005 | Park et al. | |
| 7,045,577 B2 | 5/2006 | Wilkes et al. | |
| 7,232,877 B2 | 6/2007 | Figovsky et al. | |
| 7,495,034 B2 | 2/2009 | Litke et al. | |
| 7,550,517 B2 * | 6/2009 | Stanjek | C08G 18/4825 521/170 |
| 7,660,427 B2 | 2/2010 | Litke et al. | |
| 8,747,605 B2 | 6/2014 | Lutz et al. | |
| 9,133,312 B2 * | 9/2015 | Hofmann | B29B 7/007 |
| 2004/0072921 A1 * | 4/2004 | Stanjek | C08J 9/146 521/155 |
| 2005/0016677 A1 | 1/2005 | Carlson et al. | |
| 2005/0124709 A1 | 6/2005 | Krueger et al. | |
| 2005/0238824 A1 | 10/2005 | Ogonowski et al. | |
| 2006/0047010 A1 | 3/2006 | O'Leary | |
| 2007/0066751 A1 | 3/2007 | Goddard | |
| 2007/0072981 A1 | 3/2007 | Miller | |
| 2008/0161430 A1 | 7/2008 | Korwin-Edson et al. | |
| 2008/0161431 A1 | 7/2008 | Korwin-Edson et al. | |
| 2008/0161432 A1 | 7/2008 | Korwin-Edson et al. | |
| 2008/0161433 A1 | 7/2008 | Korwin-Edson et al. | |
| 2009/0111902 A1 | 4/2009 | Korwin-Edson et al. | |
| 2009/0176903 A1 | 7/2009 | Muenz et al. | |
| 2010/0175810 A1 | 7/2010 | Korwin-Edson et al. | |

(Continued)

FOREIGN PATENT DOCUMENTS

WO 2010108920 A1 9/2010

OTHER PUBLICATIONS

Cort, Adam, "Epoxies: One Component or Two?", Assembly Magazine, Apr. 2004.
Loh, Gary, et al., White Paper, Development Program Update for Low GWP Foam Expansion Agent, DuPont Formacel, 2009.
2010 Product Guide—UV Cure Oligomers For Performance Applications, Bomar Special Ties Company, www.bomarspecialties.com.
"8 Benefits of Using a Two-Part Epoxy" published by Hotmelt.com, accessed from the Hotmelt.com website in Mar. 2020.
Office Action from U.S. Appl. No. 13/346,833 dated Sep. 24, 2015.
Office Action from U.S. Appl. No. 13/346,833 dated Nov. 9, 2016.
Office Action from U.S. Appl. No. 13/346,833 dated Mar. 20, 2017.
Office Action from U.S. Appl. No. 13/346,833 dated Sep. 27, 2017.

(Continued)

*Primary Examiner* — Melissa A Rioja
(74) *Attorney, Agent, or Firm* — Calfee, Halter & Griswold LLP

(57) ABSTRACT

Hybrid spray foams utilize a urethane reactant, a crosslinker, and an (optional) epoxy and/or acrylic resin along with a blowing agent and rheology modifier to produce a quick-setting foam that remains in place until the foam forms and cures. The urethane reactant may be formed as an adduct with or without the use of isocyanate chemistry. In some embodiments, the polyurethane oligomer is made by reacting cyclocarbonates and di- or polyamines, while in other embodiments the polyurethane backbone employs the use of commercially available capped or blocked urethane oligomers made by any method. The oligomers contain reactive groups, typically at the oligomer ends, that crosslink with crosslinkers or with acrylic or epoxy resins to form hybrid polyurethane foams. Foams may also contain a plasticizer, and/or a surfactant as well as other optional additives. Methods of making such foams are also provided.

17 Claims, 2 Drawing Sheets

(56) References Cited

U.S. PATENT DOCUMENTS

2011/0054055 A1    3/2011    Schmitz et al.
2012/0211161 A1    8/2012    Lutz et al.

OTHER PUBLICATIONS

Office Action from U.S. Appl. No. 13/346,833 dated Apr. 10, 2018.
Office Action from U.S. Appl. No. 13/346,833 dated Jan. 8, 2019.
Office Action from U.S. Appl. No. 13/346,833 dated May 13, 2019.
Office Action from U.S. Appl. No. 13/346,833 dated Nov. 21, 2019.
Office Action from U.S. Appl. No. 13/346,833 dated Mar. 24, 2020.
Office Action from U.S. Appl. No. 13/346,833 dated Sep. 18, 2020.
Office Action from U.S. Appl. No. 13/346,833 dated Apr. 26, 2021.
Office Action from U.S. Appl. No. 13/346,833 dated Oct. 18, 2021.
Office Action from U.S. Appl. No. 13/346,833 dated Feb. 17, 2022.
Office Action from U.S. Appl. No. 13/346,833 dated Jun. 20, 2022.

\* cited by examiner

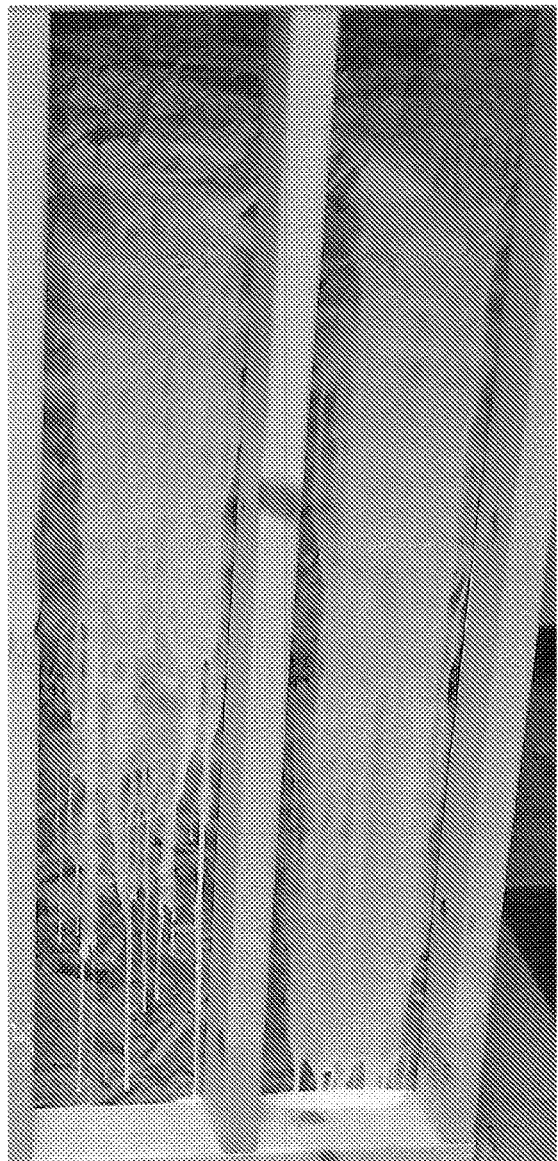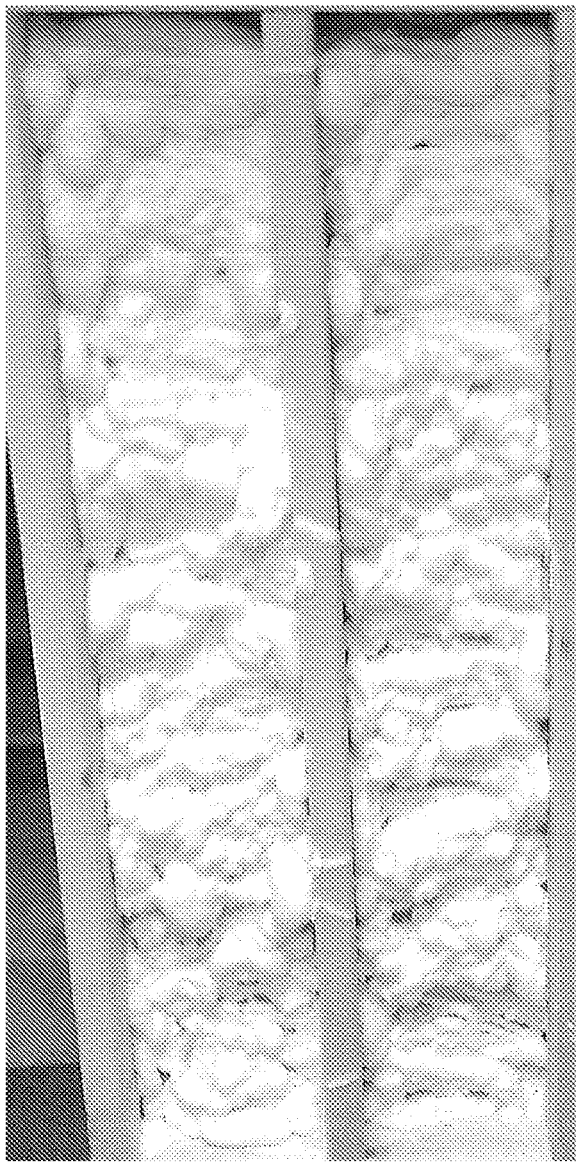
Fig. 2A                    Fig. 2B

HYBRID POLYURETHANE SPRAY FOAMS MADE WITH URETHANE PREPOLYMERS AND RHEOLOGY MODIFIERS

CROSS-REFERENCE TO RELATED APPLICATIONS

This application is a continuation of U.S. application Ser. No. 13/346,833, filed Jan. 10, 2012, which claims the benefit of U.S. Provisional Application No. 61/433,561, filed Jan. 18, 2011, the entire contents of which are incorporated by reference.

TECHNICAL FIELD

The present invention relates generally to spray foams that are used to fill cavities, cracks, and crevices to enhance the sealing and insulating properties of buildings and, more particularly, to user-friendly spray foams based on urethane oligomers or prepolymers that avoid hazardous monomeric isocyanates. In most embodiments, rapidly crosslinking film-forming polymers are used and rheology modifiers are incorporated to resist mobility of the composition while allowing it to foam and cure.

BACKGROUND OF THE INVENTION

Spray foams have found widespread utility in the fields of insulation and structural reinforcement. For example, spray foams are commonly used to insulate or impart structural strength to items such as automobiles, hot tubs, refrigerators, boats, and building structures. In addition, spray foams are used in applications such as cushioning for furniture and bedding, padding for underlying carpets, acoustic materials, textile laminates, and energy absorbing materials. Typically, spray foams, especially those used as insulators or sealants for home walls, are polyurethane spray foams.

Polyurethane spray foams and their methods of manufacture are well known. Typically, polyurethane spray foams are formed from two separate components, commonly referred to as an "A" side and a "B" side, that react when they come into contact with each other. In traditional polyurethane foams, the first component, or the "A" side, contains an isocyanate such as a di- or poly-isocyanate that has a high level of highly reactive isocyanate (—N═C═O) functional groups on the molecule. The second component, or "B" side, contains nucleophilic reagents. Other components may include surfactants, blowing agents, catalysts, and/or other auxiliary agents. The nucleophilic reagents are generally polyols having two or more hydroxyl groups, primary or secondary polyamines, and/or water. In some cases, mixtures of diols and triols are used to achieve the desired foaming properties. The overall polyol hydroxyl number is designed to achieve a 1:1 ratio of first component to second component (A:B). U.S. Pat. No. 5,444,099 to Abe et al., U.S. Pat. No. 4,945,120 to Kopp et al. and U.S. Pat. No. 3,984,360 to Galbreath et al. disclose polyurethane spray foams which may be capable of being applied at low temperatures. The polyurethane foams in each these patents require a polyisocyanate component.

A major problem associated with conventional polyurethane spray foams is that the first component (the "A" side) typically contains high levels of hazardous methylene-diphenyl-di-isocyanate (MDI) monomers. When the foam reactants are sprayed, the MDI monomers form droplets that may be inhaled by workers installing the foam if stringent safety precautions are not followed. An additional problem with such conventional polyurethane spray foams is that residual polymeric methylene-diphenyl-di-isocyanate (PMDI) that is not used is considered to be a hazardous waste. PMDI typically has an NCO content of about 20%. Therefore, specific procedures must be followed to ensure that the PMDI waste product is properly and safely disposed of in a licensed land fill. Such precautions are both costly and time consuming.

Attempts have been made to reduce or eliminate the presence of isocyanate and/or isocyanate emission by spray foams into the atmosphere. For example, latex foams have been used to reduce or eliminate the presence of isocyanate and/or isocyanate emission by spray foams. Typical plural component latexes are supplied with a latex resin as the major component in the "A" side and a crosslinking agent as the minor component in the "B" side. The crosslinking agent in the latex spray foams is generally highly reactive. Thus, the crosslinking agent is generally supplied neat (i.e., not in solution). Additionally, the high reactivity of the crosslinking agent may reduce the stability and result in a short shelf life of the foamable material. U.S. Patent Publication Nos. 2008/0161430; 2008/0161431; 2008/0161433; 2008/0161432; 2009/0111902; and 2010/0175810 to Korwin-Edson et al. disclose a room temperature crosslinked latex foams.

Additionally, attempts have been made to utilize prepolymerization to lower the concentration of diisocyanate monomers. For example, U.S. Patent Publication No. 2006/0047010 to O'Leary teaches a spray polyurethane foam that is formed by reacting an isocyanate prepolymer composition with an isocyanate reactive composition that is encapsulated in a long-chain, inert polymer composition. The isocyanate prepolymer composition contains less than about 1 wt % free isocyanate monomers, a blowing agent, and a surfactant. Although these pre-polymers for spray foams contain low concentrations of diisocyanate monomers, they still contain isocyanate groups. Thus, these foams may be better than conventional polyurethane foams from a toxicological point of view, but are still considered to be hazardous. In addition, such foams do not solve the waste problems discussed above. Nor have such foams achieved toxicological acceptance.

Despite attempts to reduce or eliminate the use of isocyanate in spray foams and/or reduce isocyanate emission into the air, there remains a need in the art for a spray foam that is non-toxic, environmentally friendly, and stable over time.

SUMMARY OF THE INVENTION

The spray foams of this invention utilize a urethane oligomer or prepolymer that may be formed as an adduct with or without the use of isocyanate chemistry. In some embodiments, the polyurethane oligomer is made by reacting cyclocarbonates and di- or polyamines, while in other embodiments the polyurethane backbone employs the use of commercially available capped or blocked urethane oligomers, made by any method. In two part (A/B) foams, the oligomers form one component and contain reactive groups that crosslink with reactive groups of the other component to form hybrid polyurethane foams. The spray foam also includes a blowing agent(s) to produce the gassing or foaming, and a rheology modifier. Foams may also contain a plasticizer, and/or a surfactant as well as other optional additives. Methods of making such foams are also provided.

In one aspect, the invention is a spray foam system comprising
  a urethane reactant having at least two reactive functional groups other than isocyanates, the urethane reactant selected from (a) a preformed urethane prepolymer and (b) a cyclocarbonate and a polyamine that react in situ to form a urethane prepolymer adduct;
  a crosslinker having at least two reactive functional groups adapted to be rapidly crosslinked with the reactive functional groups of the urethane reactant to form a hybrid polyurethane, optionally with a resin polymer having further reactive functional groups;
  a blowing agent for initiating a foaming reaction; and
  a rheology modifier;
  wherein the urethane reactant, the crosslinker and the optional resin polymer are separated into at least two parts on the basis of their reactive functional groups to prevent premature crosslinking until a foaming reaction is initiated.

As noted above the urethane reactant may comprise a pre-formed urethane oligomer, or one formed in situ during the foaming reaction. Preformed urethane oligomers include the NIBA type and also IBA types (as defined later herein) provided the isocyanate ends are capped with other reactive functionalities like amine or acrylate. Urethane reactants will generally have aliphatic or aromatic backbones or a mixture of the two. Polyester and polyether backbones are typical. Preformed urethane reactants include commercially known urethane acrylate oliogomers or UAOs, as well as NIPU-like oligomers formed from cyclocarbonates and amines. Urethane oligomers formed in situ from building blocks include the cyclocarbonate and polyamine reactants, although heat must generally be supplied for this reaction to proceed quickly enough for the rapid tack-free cures required in the building industry. Heat may be supplied externally or by internal heat of chemical reactions, such as heat generated by the addition of acrylic monomers and polyamines.

Thus, in some embodiments, the compositions further comprises optional acrylate monomers, or optional resin polymers, like epoxy or acrylic resins. These may produce internal heat of reaction as well as participate in crosslinking reactions to rapidly form the foams.

The composition further comprises a blowing agent that gives off a gas or expands to fill polymeric cells of the foam. The blowing agent may be a single chemical compound that generates a gas upon heating, irradiation, or photo initiation, two or more chemicals that form a gas upon mixing, or a phase change blowing agent. The blowing agent is generally a low-boiling point hydrocarbon or halogenated hydrocarbon like a fluorocarbon. Some specific fluorocarbon blowing agents include HFC 245fa and FEA-1100 and mixtures thereof.

In another aspect, the invention relates to a method of sealing, insulating or sealing and insulating part of a building structure, comprising
  mixing the at least two parts containing the urethane reactant and crosslinking components of the spray foam system described above;
  applying the mixture to the building structure, thereby permitting the urethane reactant, the crosslinker and optional resin polymer to crosslink, and
  initiating a blowing reaction to form a foamed product, the rheology modifier holding the mixture in place against the building structure for a time sufficient for the blowing agent to produce a three-dimensional, tack-free foamed product.

In some embodiments, the method may include applying heat to one or more parts of the spray foam to a temperature above ambient to facilitate the crosslinking reaction. In some embodiments, the two parts are separately delivered to an application device, such as a sprayer or spray gun, mixed in the application device, optionally heated in the spray device, and applied to the building structure from the application device. When applied to vertical surfaces of a building structure, it is important that the foams crosslink rapidly so that they withstand the force of gravity until they become cured. In some embodiments, the foamed product cures to tack-free status in less than about 120 seconds, less than 60 seconds, less than 30 seconds or even less than 15 seconds. In some embodiments, the foamed product cures to resilient hardness in less than about 20 minutes, less than about 15 minutes, or less than about 10 minutes. In some embodiments, the foam system is applied to a seam or crevice between two structural components, or into a cavity or open space framed by structural components, or both.

In a third aspect, the invention relates to a hybrid polyurethane foamed product made by the process described above using the foam system described above. Thus, the foamed product is the product of
  reacting an optional non-isocyanate reactive functional groups of a urethane reactant with a crosslinker and optionally with a resin polymer in the presence of a rheology modifier under conditions to rapidly form cells of a crosslinked hybrid polyurethane polymer; while initiating a blowing reaction to cause a gas to be disposed within at least some of the cells.

In some embodiments, the foamed product has cells are at least 80% closed or an 80% closed cell content; in other embodiments the closed cell content may be greater than 90%. In other embodiments, a more open cell structure is desired and the closed cell content need only be 50% or even less. As with the foam system described above, the resin, when used, may include epoxy or acrylic functional groups; the backbones may be aliphatic or aromatic and may include polyether and polyester backbones; and the blowing agent may comprise a low-boiling point hydrocarbon or halogenated hydrocarbon like fluorocarbons.

Various other aspects of this invention will become apparent to those skilled in the art from the following detailed description of the preferred embodiment, when read in light of the accompanying drawings.

BRIEF DESCRIPTION OF THE DRAWINGS

The accompanying drawings, incorporated herein and forming a part of the specification, illustrate the present invention in its several aspects and, together with the description, serve to explain the principles of the invention. In the drawings, the thickness of the lines, layers, and regions may be exaggerated for clarity.

FIGS. 2A and 2B are illustrations of actual spray foams made and sprayed as described in more detail in the examples.

DETAILED DESCRIPTION

Figure 1:
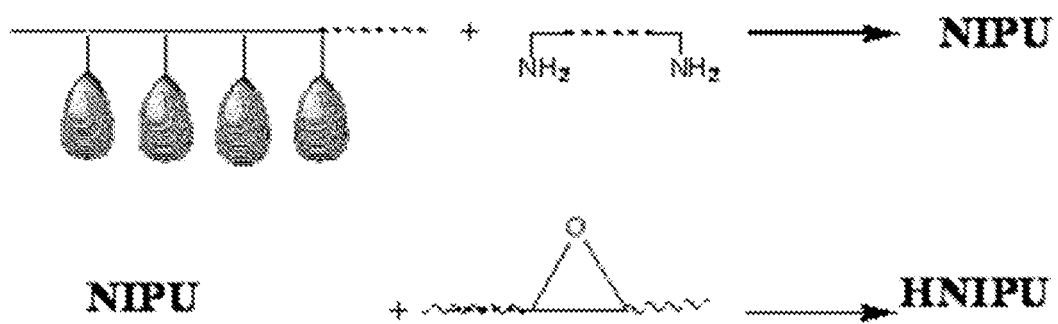
FIG. 1 is an illustration depicting the chemical reaction of cyclocarbonate groups with amine groups to form a non-isocyanate polyurethane (NIPU) and subsequently reacting the non-isocyanate polyurethane with epoxy groups to form a hybrid non-isocyanate polyurethane (HNIPU)

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including books, journal articles, published U.S. or foreign patent applications, issued U.S. or foreign patents, and any other references, are each incorporated by reference in their entireties, including all data, tables, figures, and text presented in the cited references.

Unless otherwise indicated, all numbers expressing ranges of magnitudes, such as angular degrees or web speeds, quantities of ingredients, properties such as molecular weight, reaction conditions, dimensions and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements. All numerical ranges are understood to include all possible incremental sub-ranges within the outer boundaries of the range. Thus, a range of 30 to 90 degrees discloses, for example, 35 to 50 degrees, 45 to 85 degrees, and 40 to 80 degrees, etc.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, and any other references, are each incorporated by reference in their entireties, including all data, tables, figures, and text presented in the cited references.

Terms that are derivative from one another may be used interchangeably, except where context mandates otherwise. For example, amine and amino; carboxy, carboxyl and carboxylic; acrylic and acrylate; hydroxyl and hydroxyl; hydrogen, hydride and proton; epoxy and epoxide; etc.

Insulating Foams Generally

The terms "foamable composition" and "foam composition" may be interchangeably used in this application. In addition, the terms "oligomer" and "prepolymer" may be interchangeably used herein.

The term "R-value" is the commercial unit used to measure the effectiveness of thermal insulation and is the reciprocal of its thermal conductance which, for "slab" materials having substantially parallel faces, is defined as the rate of flow of thermal energy (BTU/hr or Watt) per unit area (square foot=$ft^2$ or square meter=$m^2$) per degree of temperature difference (Fahrenheit or Kelvin) across the thickness of the slab material (inches or meters). Inconsistencies in the literature sometimes confuse the intrinsic thermal properties resistivity, r, (and conductivity, k), with the total material properties resistance, R, (and conductance, C), the difference being that the intrinsic properties are defined as being per unit thickness, whereas resistance and conductance (often modified by "total") are dependent on the thickness of the material, which may or may not be 1 unit. This confusion, compounded by multiple measurement systems, produces an array of complex and confusing units the most common of which are:

| | English (inch-pound) | Metric/SI units |
|---|---|---|
| Intrinsic resistivity, r (conductivity, k, is reciprocal) | $\dfrac{hr * ft^2 *° F.}{BTU * in}$ | $\dfrac{° K. * m}{W}$ |
| Total material resistance, R (conductance, C, is reciprocal) | $\dfrac{hr * ft^2 *° F.}{BTU}$ | $\dfrac{° K. * m^2}{W}$ |

For ease of comparison of materials of differing thicknesses, the building industry sometimes reports thermal resistance (or conductance) per unit thickness (e.g. per inch) effectively converting it to thermal resistivity (conductivity), but retains the traditional symbol, R or R-value.

"Sealing" as used herein refers to the prevention or hindering of the movement of air such as drafts (i.e. convection) that can move through cavities, gaps, and poorly sealed seams, whereas "insulating" refers to the prevention or hindering of all forms of heat transfer, including convection, conduction and radiation. Thus, sealing is a specialized case of insulating. Sealing is also important for noise reduction.

In some embodiments, the present invention relates to two-part foamable a compositions. The foams may be used to fill cavities of buildings to improve the sealing and insulation properties. Additionally, the inventive foams may be used to seal cracks and crevices, such as those around windows and doors. In alternative uses, the inventive foams can be used in spray, molding, extrusion, and injection molding (e.g., reaction injection molding (RIM)) applications. In one exemplary embodiment, the inventive foam is formed from two components or reaction mixtures, namely, an A-side and a B-side. The A side may contain an acrylic or epoxy resin, or both, along with other additives such as surfactants and rheology modifiers. The B side contains a urethane reactant with reactive functional groups—such as acrylic, carboxy, amine or hydroxy—and no free isocyanate groups. The B-side may optionally contain additives such as a surfactant and/or rheology modifier. One or both of the A side and B side contains a blowing agent.

Urethane Reactants

A wide variety of urethane reactants are useful with the invention. In some embodiments the urethane reactant is a preformed urethane adduct, while in other embodiments the urethane reactant is two or more building blocks that from the urethane adduct in situ. Urethane reactants have urethane bond backbones with reactive functional groups other than isocyanates found at the termini and/or pendent from side chains. They may be categorized into two broad groups based on the method used to manufacture them. When isocyanate monomers are used to form the urethane or polyurethane adducts, the oligomer or prepolymer may be referred to as an "isocyanate-based adduct" or "IBA", and in this case the isocyanate ends are blocked or capped with other suitable reactive functional groups. This first type is generally used in the invention as preformed adduct to avoid exposure to isocyanate monomers. When non-isocyanate monomers are used, the oligomer or prepolymer may be referred to as a "non-isocyanate-based adduct" or "NIBA"—which is sometime also referred to as a non-isocyanate polyurethane or "NIPU". The chemistries used to make NIBAs or NIPUs avoids the isocyanate ends directly and instead introduces amine and/or carboxyl functional groups. This second type may be used as preformed adduct or as the individual reactive building blocks of the urethane reactant.

The urethane reactants may be present in an amount from about 5 to about 90 percent by weight of the foamable composition, and in exemplary embodiments, in an amount from about 25 to about 90 percent by weight, or from about 25 to about 40 percent by weight.

Preformed Urethane Oligomers

Polyurethanes are traditionally made using a di or polyisocyanate monomer of the general formula O=C=N—R'—N=C=O and a di or polyol monomer of general formula HO—R²—OH, where R¹ and R² are various backbones, the nature of which helps classify and define the precise properties of the polymer. For example, the R-groups may be aliphatic, aromatic, polyester, polyether, polybutadiene, or mixed; and they may be linear, simple branched or dendritic in nature. The two monomers react to form urethane oligomers or prepolymers of the general formula I:

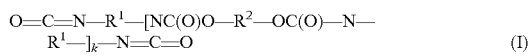

wherein k is an integer from 2 to about 50 or more depending on the polymerization conditions, the relative amounts of each monomer and the use of chain terminators—all of which is well known in the art. Formula I assumes a linear oligomer, but synthesis of branched oligomers is possible from substituents on either $R^1$ or $R^2$. Substituents on either $R^1$ or $R^2$ can also impart other functional groups, such as carboxyl, amino, hydroxyl, that can be used to enhance the crosslinking reactions. The most common isocyanate monomers for use in making polyurethanes are: diphenylmethane 4,4-diisocyanate ("MDI"), naphthalene 1,5-diisocyanate ("NDI"), toluene diisocyanate ("TDI") and hexamethylene diisocyanate ("HDI"). Other aliphatic polyisocyanate examples include isophorone diisocyanate, dicyclohexylmethane-4,4'-diisocyanate, 1,4-tetramethylene diisocyanate, 1,5-pentamethylene diisocyanate, 1,7-heptamethylene diisocyanate, 1,8-octamethylene diisocyanate, 1,9-nonamethylene diisocyanate, 1,10-decamethylene diisocyanate, 2,2,4-trimethyl-1,5-pentamethylene diisocyanate, 2,2'-dimethyl-1,5-pentamethylene diisocyanate, 3-methoxy-1,6-hexamethylene diisocyanate, 3-butoxy-1,6-hexamethylene, omega, omega'-dipropylether diisocyanate, 1,4-cyclohexyl diisocyanate, 1,3-cyclohexyl diisocyanate, trimethylhexylnethylene diisocyanate and combinations thereof.

A wide variety of polyether, polyester, polycarbonate, hydrocarbon, aromatic and other polyols may be used. For example, representative polyether polyols useful in preparing the urethane oligomers include straight or branched alkylene oxides having from one to twelve carbon atoms (C1-12), prepared by methods known in the art. Desirably, the polyether polyols have an average molecular weight, as determined by vapor pressure osmometry (ASTM-D 3592), sufficient to give the urethane oligomer a molecular weight of about 6,000 daltons, desirably not more than 5,000 daltons and more desirably not more than 4,000 daltons. Examples include, without limitation, polytetramethylene polyol, polymethylene oxide polyol, polyethylene oxide polyol, polypropylene oxide polyol, polybutylene oxide polyol, tetrahydrofuran (THF)-sym-polyether polyol and combinations thereof.

Representative hydrocarbon polyols used to prepare the urethane oligomers also include hydrocarbon polyols, straight or branched, having a molecular weight of from about 600 to 4,000. Non-limiting examples include fully or partially hydrogenated polybutadiene polyol, polybutadiene polyol hydrogenated to an iodine number of from 9 to 21, and fully or partially hydrogenated polyisobutylene polyol.

Representative polycarbonate polyols used to prepare the urethane oligomers include but are not limited to the reaction products of dialkyl carbonate with an alkylene diol, optionally copolymerized with alkylene ether diols.

Notably, Formula I still contains isocyanate termini and thus is not a urethane reactant as defined herein. The isocyanate groups are highly reactive and may easily be replaced or capped with known chemistries. For example, urethane acrylate oligomers (UAOs) are known to those skilled in the art of coatings. Many are available from suppliers like Sartomer (Exton, PA) and Bomar Specialties (Torrington, CT). The UAOs may be made via isocyanate or non-isocyanate chemistries, provided the ends can be capped acrylates or methacrylates.

More specifically, useful di- or polyfunctionalized urethane acrylates include aliphatic polyester urethane diacrylates. Aliphatic polyester urethane diacrylates having high molecular weights, such as 2,000 to 7,000, are particularly desirable. Other mono-, di-, or polyfunctional urethane acrylate oligomers useful in the present invention can be described as the acrylated reaction product of an aliphatic alcohol, such as polycarbonate polyol, a polyether polyol, or ethylene glycol monoacrylate, and a polyisocyanate.

As noted above, the nature of $R^1$ and $R^2$ can create many different urethane oligomers and prepolymers having different properties. The aliphatic and aromatic R groups may perform differently; the straight and branched R groups are likely to perform differently; and the ratio between the polyester and polyether nature of the R groups are likely to perform differently. The distance between functional groups and the rotational degrees of freedom of the backbones likely impact properties such as the setting time or speed of reaction, viscosity, solubility and other properties of the oligomer. In some embodiments, the oligomer functionality is greater than 2, such as 3, 4 or 6. Exemplary UAOs include Bomar BR series (100, 300, 400, 500, 700 and 900) and Sartomer series CN 97x, 99x, 90xx, and 91xx.

Other potential reactive end caps are useful besides acrylates. For example, siloxy and carboxyl ends have been described in co-pending U.S. patent application Ser. No. 13/221,373. Additionally, reactive amine functional end caps may be obtained by reacting the isocyanate ends with primary or secondary amines, or by adducts preformed using building blocks described below.

Urethane Reactant Building Blocks

Amine functional ends may also obtained by another known route, using cyclocarbonate and polyamine chemistry as taught in U.S. Pat. No. 5,175,231 to Rappoport, et al. This chemistry has been used to make non-isocyanate polyurethane (NIPU) foams, but is notoriously slow. Thus, although foams made directly from NIPU chemistry have generally been slow to cure, the building blocks may be used in the invention in a process accelerated with heat or, alternatively, amine-capped urethane oligomer adducts can be preformed. The presence of a di- or poly epoxy resin in the other side, with or without acrylate monomer, forms a hybrid non-isocyanate polyurethane (HNIPU).

The cyclocarbonates may be prepared as described in U.S. Pat. No. 5,175,231 to Rappoport, et al.; or from bio-based epoxies, such as epoxidized soy bean oil (EBSO), thereby resulting in a bio-based non-isocyanate polyurethane (NIPU) or a bio-based hybrid non-isocyanate polyurethane (HNIPU). Such cyclocarbonates may be used in the A-side. Hybrid non-isocyanate polyurethane may also be formed when an epoxy functional group is present in the other side. It is to be appreciated that the epoxy resin may also be a bio-based epoxy (e.g., epoxidized soy bean oil (ESBO) or a partially bio-based epoxy.

The A-side also contains a polyfunctional amine, preferably having two or more primary amines. Examples of suitable polyfunctional amines include isophorone diamines, trimethylhexamethylene diamines, polyoxyalkyleneamines (e.g., Jeffamines®, commercially available from Huntsman), and aliphatic amines (e.g., Ancamines®, commercially available from Air Products), Epikure™ line commercially available from Momentive, (Columbus, OH). In at least one exemplary embodiment, the di- or polyamine crosslinking agent is one or more of an amidoamine, a cyclic, aliphatic, or aromatic di- or polyamine containing primary and/or secondary amine functionalities or mixtures thereof. The polyfunctional amine crosslinking agent may be present in the A-side in an amount from about 3.0 to about 30% by weight of the dry foam composition, or in an amount from about 1.0 to about 20% by weight. Although a 1:1 mole ratio of the functional groups is preferred, this molar ratio is variable and may encompass a wider range, such as, for example, from 0.5:1 to 2:1 to provide the optimum crosslinking in the final foam products.

The B-side of the foam composition, as indicated previously, contains a di- or poly epoxy resin and preferably an acrylate monomer. The acrylate monomer and polyamine may react rapidly to produce internal heat to accelerate formation of the urethane reactant from the cyclocarbonate and polyamine building blocks. Optionally a plasticizer and/or a surfactant and/or a non-reactive resin may be included. The non-reactive resin is a resin that does not react with the di- or polyamine crosslinking agent, but is otherwise non-limiting.

Crosslinker

The crosslinker contains reactive functional groups that react with the urethane reactant and optional resin polymer. The nature of the reactive functional group will depend on the nature of the other functional groups. For example, for urethane acrylate oligomers, a di- or polyamine crosslinker is used, and those polyamines described above may be used as crosslinker. For amine-functional urethane reactants, an epoxy or acrylic functional crosslinker may used and this crosslinker may be supplied as the resin polymer, in which case additional or different resin polymer may still be optionally added. Resin polymers are described below.

It will be understood that function of the urethane reactant the choice of agents (urethane reactant, crosslinker and optional resin polymer) to mix together in either the A-side or B-side will depend on the reactivity of their respective functional groups. In general, amine functionalities must be kept separate from epoxide and acrylate moieties (whether present in the resin or urethane reactant), but polyamines may be combined with amine-functionalized urethane reactants (e.g. NIPU), while epoxy and/or acrylic resins are employed in the other part.

The crosslinking agent may be present in an amount from about 3.0 to about 30% by weight of the dry foam composition, or in an amount from about 1.0 to about 20% by weight. Although a 1:1 mole ratio of the functional groups is preferred, this molar ratio is variable and may encompass a wider range, such as, for example, from 0.5:1 to 2:1 to provide the optimum crosslinking in the final foam products.

Resin Polymers

Resin polymers have functional groups that react with and crosslink with the functional moieties of the urethane reactants. Epoxy resins are widely known and used in the polymer arts. Epoxy resins are typically characterized by molecular weight and by a measure of the number of available epoxy moieties. Such measures may include "epoxide number" or "epoxide equivalents" or "weight per epoxide". Useful epoxy resins have epoxide equivalents from about 150 to about 400, or from about 180 to about 325. Illustrative, but non-limiting epoxy resins are available from Dow, Hexion and Momentive under the tradenames: DER 331 (epoxide equivalent weight in g/eq=182-192); Epon 828 (wt/epoxide=185-192); Epon 8111 (wt/epoxide=300-320), for example. The epoxy resin may be present in the formulation in amounts from about 5 to about 70 weight percent, more typically from about 15 to about 60 weight percent.

In addition to the epoxy resin and urethane reactant that mainly form the polymer film of the cells of the foam, it is generally desirable and important to include acrylate monomers, especially when the urethane reactant is not a preformed adduct. The acrylate monomers function as cure accelerators and modifiers for the epoxy/amine polymerization curing reaction. Suitable acrylate monomers include aliphatic acrylate monomers such as, for example, MCure 400, MCure 400Ep, MCure 202, SR 399, SR 610, SR 492, SR 259, SR 248, SR 247, SR 214, and CD 9021 (all commercially available from Sartomer, Exton, PA). Acrylate monomers may be present in the formulation in amounts from about 10 to about 60 weight percent, more typically from about 25 to about 40 weight percent.

Blowing Agent

In addition to the components set forth above, at least one side, A-side, B-side or both, contains a blowing agent. Hydrocarbon and halogenated/fluorinated hydrocarbon blowing agents are well known. For example halogenated aliphatic hydrocarbon blowing agents include "Freon-like" fluorocarbons, chlorocarbons and chlorofluorocarbons. Examples of partially or fully halogenated fluorocarbons include methyl fluoride, difluoromethane (HFC-32), perfluoromethane, ethyl fluoride (HFC-161), 1,2-difluoroethane (HFC-142), 1,1-difluoroethane (HFC-152a), 1,1,1-trifluoroethane (HFC-143a), 1,1,1,2-tetrafluoro-ethane (HFC-134a), 1,1,2,2-tetrafluoroethane (HFC-134), pentafluoroethane (HFC-125), perfluoroethane, 2,2-difluoropropane (HFC-272fb), 1,1,1-trifluoropropane (HFC-263fb), 1,1,1,3,3-pentafluoropropane (HFC 245fa), 1,1,1,2,3,3,3-heptafluoropropane (HFC-227ea), perfluoropropane, 1,1,1,3,3-pentafluorobutane (HFC-365mfc), perfluorobutane, and perfluorocyclobutane. Examples of partially halogenated chlorocarbons and mixed, chlorofluorocarbons for use in this invention include methyl chloride, methylene chloride, chlorodifluoromethane (HCFC-22), ethyl chloride, 1,1,1-trichloroethane, 1,1,1-trifluoroethane, 1,1-dichloro-1-fluoroethane (HCFC-141b), 1-chloro-1,1-difluoroethane (HCFC-142b), 1,1-dichloro-2,2,2-trifluoroethane (HCFC-123) and 1-chloro-1,2,2,2-tetrafluoroethane (HCFC-124), pentafluoroethane, dichloropropane, and the like. Examples of fully halogenated chlorofluorocarbons include trichloromonofluoromethane (CFC-11), dichlorodifluoromethane (CFC-12), trichlorotrifluoroethane (CFC-113), dichlorotetrafluoroethane (CFC-114), chloroheptafluoropropane, dichlorohexafluoropropane, and HFC-245fa Desirably, the blowing agent is non-reactive (with other components) and environmentally friendly and has zero or very little ozone depletion potential (ODP) and little to no global warming potential (GWP). The blowing agent may be a chemical compound that, when heat or light activated, forms a gas. The generated gas may be $N_2$, $O_2$, $H_2$, or other non-carcinogenic, gases. For instance, azodicarbonamide is a chemical compound that, upon heating, releases N2 gas, and would be a suitable blowing agent in the foamable composition. Additionally, alkylsiloxanes, such as XIAMETER®, and MHX-1107 Fluid (all available from Dow Corning (Midland, MI)), which may release $H_2$ when reacting with amine hardeners, may be used as a blowing agent and/or as a crosslinking agent in the instant invention. Other examples include diazo compounds (i.e., $CH_2N_2$) and aliphatic azide (i.e., R—N=N=N), which decompose on irradiation to give nitrogen gas.

Phase change blowing agents such as low boiling point hydrocarbons (e.g., cyclopentane and n-pentane) and inert gases such as air and nitrogen can also be used. It is to be appreciated that the chemical compound is not a conventional blowing agent in the sense that it is a hydro-fluoro-carbon (HFC) or a hydro-chloro-fluorocarbon (HCFC) blowing agent, such as, for example, HFC-245fa. Another blowing agent, FEA-1100 (1,1,1,4,4,4-hexafuoro-2-butene), is a fourth generation fluorocarbon product available from DuPont. According to properties described in a white paper authored by Loh, et al, and published at: http://www2.dupont.com/Formacel/en US/assets/downloads/white paper FEA-1100.pdf (as of Jul. 21, 2011) FEA-1100 has shown very low global warming potential, zero ozone depletion potential, is non-flammable and stable at ambient room temperatures, and has higher boiling point than HFC 245fa, making it safer and easier to work with. Additionally, the blowing agent may be formed of more than one blowing agent (e.g., blowing agent package), such as, for example, the combination of a chemical blowing agent and a gas (e.g. HFC blowing agent), or blends of two HFC blowing agents. The blowing agent may be present in an amount from about 7 to about 40 percent by weight of the composition, and in exemplary embodiments, in an amount from about 15 to about 30 percent by weight.

The A-side and the B-side may be added at a 1:1, 1:2, 1:3 or 1:4 ratio (A-side:B-side), and in exemplary embodiments, they are added in an amount in a 1:2 ratio. In addition, polymer microspheres such as, but not limited to, Expancel® 031 DUX 40 could be used to help in foaming, to increase the viscosity of the A-side and/or the B-side, and to reduce the density of the foam. Because microspheres have a solid form, they naturally increase the viscosity of the side in which it is added. In addition, the microspheres expand at a certain temperature, thereby resulting in a closed-cell sphere that contains a blowing agent. This blowing agent within the microsphere may act as a blowing agent in the foamable composition.

Rheology Modifiers

Controlling the rate of polymerization and the rate of blowing agent is important to the forming of good quality foams, particularly foams that depend on a vertical substrate for support. It is also desirable that the A-side and the B-side have the same or nearly the same viscosity to achieve proper mixing of the A-side components with the B-side components. A 1:1 ratio promotes easy mixing of the components of the A-side and B-side. Additionally, it is desirable for the A-side and B-side reactants to have low enough initial viscosity that they can be sprayed from a spray device, such as an application gun. For this reason, an optional but desirable component of the foaming composition is a rheology modifier—also known as a thixotrope—that can affect the flow properties of a liquid. A thixotropic mixture has high viscosity and resistance to flow at low shear (e.g. once sprayed into a cavity or onto a vertical surface) and lower viscosity when sheared (e.g. when shaken; stirred or sprayed from the application device). In foam compositions of the invention, rheology modifiers allow for low viscosity under the shear for the application device but, once sprayed, they help keep the reactants in place on a substrate against the force of gravity until the foaming and polymerization reactions are complete or at least sufficiently progressed. The rheology modifier may be present in an amount up to about 50% by weight of the dry foam composition. Preferably, the amount of rheology modifier present is about 0.1% to about 20% by weight, based on the dry foamable composition, depending upon the nature of the modifier. Rheology modifiers may be divided into five different major groups: cellulosic derivatives, polyamides, carboxyl-containing acrylics, associative thickeners, and inorganics like clay and silica. See. e.g. Werner Blank presentation at: http://www.wernerblank.com/pdfiles/rheology.pdf.

Cellulosic derivatives may operate by any of several mechanisms, including contribution to hydrodynamic volume, chain entanglement, and flocculation depletion. Suitable agents for use in the foamable composition include methyl cellulose, ethyl cellulose, hydroxyethyl cellulose (e.g., Cellosize™ available from Union Carbide). Useful carboxyl-acrylates include alkaline swellable polyacrylates (e.g., Paragum 500 available from Para-Chem), sodium polyacrylates (e.g., Paragum 104 available from Para-Chem).

Associative thickeners may affect the rheology by adsorption (e.g. hydrophobic or ion-dipole), inter- or intra-molecular self association, or micelle formation. Useful associative thickeners include those classed as hydrophobically-modified ethoxylated urethanes (HEUR-type) including those sold under the tradenames Acrysol™ (RM, TT and QR types at least Dow Chemical, Midland, MI), and KStay 700 (King Industries, Norwalk, CT); as hydrophobically-modified alkalai-swellable emulsions (HASE-type); a hybrid known as HEURASE-type; and hydrophobically-modified hydroxyethyl cellulose, (HMHEC-type).

Many rheology modifiers are inorganic minerals, clays or modified clays. Clay is common name for a wide variety of weathered mineral or igneous rock, largely feldspar. Various classification schemes, such as the Nickel-Strunz classification, divide up mineral clays according to composition and/or structure. Suitable rheology modifiers may be found in the kaolinite group, the smectite or montmorillonite group and the illite group. Generally, these groups contain sheets or layers formed of specific tetrahedral and/or octahedral structures of aluminum and silicon oxides. The layers or platelets are held together by ionic bonds with charged ions (usually cations) located between the layers. The Nickel-Strunz classification (version 10) divides silicates (group 9) into nine different subcategories, the most useful being phyllosilicates (group 9E), which itself is divided into nine subcategories, the two most useful being 9EC (with mica sheets) and 9ED (with kaolin layers). Exemplary clays from these groups include kaolin, montmorillonite or smectite, talc, mondorite, nontronite, muscovite, vermiculite, saponite, hectorite, rectorite, and minnesotaite, Bentonite is a useful impure clay largely containing montmorillonite.

It is the layers or "platelets" of phyllosilicates that give them many of their properties, including the plasticity for use as pottery. When the layers are of thickness dimensions in the few nanometer range, they are often referred to as nanoclays. An example is the NANOLIN DK series of nanoclays available from Zhejiang Fenghong Clay Chemicals Co., LTD., which are made from highly purified smectite that exhibits ultra-fine phase dimensions. The size of these nanoclays is typically in the range of 1-100 nm while been fully dispersed, the average fully dispersed thickness of platelet is around 25 nm; the aspect ratio is 100-1000.

Modified clays are formed when various processes are used to separate and expand the layers or platelets. Intercalation, exfoliation and fuming are processes that modify the layered structure. Intercalation inserts a polymer or other molecule between the platelet layers to isolate them, but without much physical separation. Exfoliation, on the other hand inserts a polymer or molecule and expands the space between layers by 10-20 fold. Fuming is a flaming process that introduces hydroxyl groups onto the surface of the silica structures.

Most clays are inorganic and therefore not very compatible with polymer foams. A specific type of modified clay that impacts hydrophilicity and solubility produces polymer-compatible clays known as "organoclays." Organoclays are modified by the replacement of the cation (usually sodium) between layers with alkylammonium ($R_4N^+$) compounds, a type of surfactant. The nitrogen end of the quaternary amine, the hydrophilic end, is positively charged, and ion exchanges onto the clay platelet for sodium or calcium. The amines used generally have long chain R groups with 12-18 carbon atoms, making them more compatible with many organic polymers. After about 30 percent of the clay surface is coated with these amines it becomes hydrophobic and, with certain amines, organophilic. Additionally, exfoliation of organoclays becomes easier since there is a larger distance between the platelets due to the bigger size of the ammonium salts compared to sodium ions.

Some non-limiting examples of the many clay-based rheology modifiers include Laponite and Garamite 1958 (Southern Clay Products), and the high temperature resistant Rilenite HT extra. Some non-limiting examples of the many rheology modifiers based on fumed alumina or fumed silica, include Aerosil and Cab-O-Sil® TS-720 (Cabot Corp.)

As described above, it is desirable that the A-side and the B-side have the same or nearly the same viscosity to permit easy application and mixing of the components of the A-side and B-side. The thickening agents may be present in the A-side and the B-side, respectively, in an amount up to about 50% by weight of the dry foam composition. The thickening agent in the A-side may be the same or different from one in the B-side, if also present there. In at least one exemplary embodiment, the amount of thickening agent present in the A-side is from about 0.1 to about 10.0% by weight, based on the dry foamable composition, and the amount of thickening agent present in the B-side is from about 0.1 to about 10.0% by weight, based on the dry foamable composition, depending upon the nature of the thickening agent.

Rheology modifiers or thickeners should be selected carefully so as not to interfere with desired final foam properties (such as percentage closed cell content and density) while they provide the needed viscosity to assist in sag prevention. For example it was shown that Cabosil TS-720, at a concentration effective for sag prevention, produced foams of lower closed cell content. On the other hand, the modified nanoclay, Garamite 1958, at a concentration effective for sag prevention, produced foams of higher closed cell content. This particular rheology modifier (Garamite 1958) was found useful in a wide variety of foam chemistries, and is expected to improve bio-based polyurethane foams as well. Bio-based polyurethane spray foams are generally slower to react than the petroleum based polyurethane foams, likely due to the higher proportion of secondary and tertiary polyols. So the use of a rheology modifier, such as Garamite, can greatly help bio-based polyurethane market.

Other Optional Additives

In the spray foam of the present invention, the A- or B-side may also include other optional, additional components such as, for example, foam promoters, opacifiers, accelerators, foam stabilizers, dyes (e.g., diazo or benzimidazolone family of organic dyes), color indicators, gelling agents, flame retardants, biocides, fungicides, algaecides, fillers, and/or conventional blowing agents. It is to be appreciated that a material will often serve more than one of the aforementioned functions, as may be evident to one skilled in the art, even though the material may be primarily discussed only under one functional heading herein. The additives are desirably chosen and used in a way such that the additives do not interfere with the mixing of the ingredients, the cure of the reactive mixture, the foaming of the composition, or the final properties of the foam.

The A- and/or B-side may optionally contain a plasticizer. The plasticizer for use in the A-side and B-side is not particularly limiting, and includes plasticizers such as phthalate ester, dimethyl adipate, dimethyl phthalate, epoxidized crop oils (e.g., Drapex 10.4, Drapex 4.4, and Drapex 6.8 available from Chemtura, butyl benzoate, Benzoflex® 2088 (a benzoate ester plasticizer available from Genovique Specialties), Benzoflex® LA-705 (a benzoate ester plasticizer available from Genovique Specialties), Triton® X-100 (an octylphenoxypolyethoxyethanol available from Cognis), PEG-400 (a polyethylene glycol available from Cognis), Cifroflex® 2 (a triethyl citrate available from Vertellus® Specialties), bio-based oils, and Citroflex® 4 (a tributyl citrate available from Vertellus® Specialties). The plasticizer may be present in an amount from about 0 to about 15% by weight.

Additionally, the presence of the plasticizer permits for the inclusion of other solid materials that may add functionality and/or cost savings to the final foamed product. For instance, fillers (e.g., calcium carbonate and wollastonite fibers), nucleating agents (e.g., talc), and/or foaming agents (e.g., sodium bicarbonate) can be included in the B-side of the foamable composition.

Also, the A-side and/or the B-side may contain one or more surfactants to lower surface tension, to assist in mixing incompatible formulation ingredients, to promote and stabilize the nucleation of bubbles during mixing, to stabilize the early stages of the reacting foam structure until sufficient polymerization has occurred to form a self-supporting network, and to counteract the defoaming effect of any solids added to or formed during the foam reaction. Useful surfactants include, but are not limited to, silicone surfactants, siloxane-polyoxyalkylene block copolymers such as Niax Silicone L-6900 (available commercially from GE Silicones (Friendly, West Virginia); Dabco DC-5598 (a silicone surfactant commercially available from Air Products and Chemicals, Inc. (Allentown, Pa.); Tegostab B 8512 (a silicone surfactant commercially available from Goldschmidt Chemical Corp. (Essen, Germany)); Vorasurf 504 (a non-silicone surfactant commercially available from Dow Chemical Co. (Midland, Mich.)); Triton™ GR-5M (a sulfosuccinate anionic surfactant commercially available from Dow Chemical Co. (Midland, Mich.)); and Dabco® DC-193 (a silicone based co-polymer surfactant available from Air Products and Chemicals, Inc. (Allentown, Pa.)). The surfactant may be present in the A- and/or B-side in an amount from about 0 to about 10.0% by weight of the dry foam composition.

In the spray foam of the present invention, the A- or B-side may also include other optional, additional components such as, for example, foam promoters, opacifiers, accelerators, foam stabilizers, dyes (e.g., diazo or benzimidazolone family of organic dyes), color indicators, gelling agents, flame retardants, biocides, fungicides, algaecides, fillers, and/or conventional blowing agents. It is to be appreciated that a material will often serve more than one of the aforementioned functions, as may be evident to one skilled in the art, even though the material may be primarily discussed only under one functional heading herein. The additives are desirably chosen and used in a way such that the additives do not interfere with the mixing of the ingredients, the cure of the reactive mixture, the foaming of the composition, or the final properties of the foam.

The A- and/or B-side may also include other optional, additional components such as, for example, foam promoters, opacifiers, accelerators, foam stabilizers, dyes (e.g., diazo or benzimidazolone family of organic dyes), color indicators, gelling agents, flame retardants, biocides, fungicides, algaecides, corrosion inhibitors, fillers, and/or conventional blowing agents. It is to be appreciated that a material will often serve more than one of the aforementioned functions, as may be evident to one skilled in the art, even though the material may be primarily discussed only under one functional heading herein. The additives are desirably chosen and used in a way such that the additives do not interfere with the mixing of the ingredients, the cure of the reactive mixture, the foaming of the composition, or the final properties of the foam.

Methods of Use

To form a two-part spray foam of the present invention, the components of the A-side and the components of the B-side are delivered through separate lines into a spray device, such as an impingement-type spray gun. The two components are pumped through small orifices at high pressure to form streams of the individual components of the A-side and the B-side. The streams of the first and second components intersect and mix with each other within the gun and begin to react. Depending on the components of the blowing agent package in the A-side and the B-side, the gas generated may be $N_2$, $O_2$, $H_2$, or other non-carcinogenic gases. The foaming reaction occurs until all of the blowing agent(s) have been reacted and no more gas is generated.

In at least one exemplary embodiment, the A- and/or B-side is heated to a desired temperature (e.g., about 120° F. to about 150° F. (or higher)) prior to adding the blowing agent. In such an embodiment, the blowing agent is added through a separate line to the heated mixture. In another exemplary embodiment, the A-side and the B-side, at least one of which contains a blowing agent, are separately heated to a desired temperature prior to mixing the two sides together. The A-side and the B-side may be heated to the same temperature or to different temperatures. For example, the side containing the blowing agent may be heated to a temperature lower than the side that does not contain the blowing agent to reduce the risk of evaporating or skipping the blowing agent. Alternatively, the A-side and the B-side, at least one of which contains a blowing agent, may first be mixed together and then heated to a desired temperature (e.g., about 120° F. to about 150° F. (or higher)). The reaction mixture (whether the A- and B-side are separately heated or whether the A- and B-side are mixed and then heated) may optionally be kept at the desired temperature until the exotherm of the reaction is higher than the desired temperature. By heating the A- and B-side (one side containing the blowing agent), the reaction proceeds more quickly and results in a decreased tack-free time.

In a further exemplary embodiment, the A- and B-side are heated prior to mixing the two sides together. The heat may be supplied as externally applied heat (as discussed above) or internally generated heat from a chemical reaction. As one example of chemically generated heat, Epon™ 8111 (a multifunctional resin containing both epoxide groups and reactive unsaturation (commercially available from Cognis)) and sodium hydroxide may be added to the A-side and Epikure™ 3271 (a modified aliphatic amine (commercially available from Hexion/Momentive)) may be added to the B-side. The reaction between the epoxy in the Epon™ 8111 and the aliphatic amine in the Epikure™ 3271 in the presence of sodium hydroxide is very fast and generates a significant amount of heat as the reaction takes place. It has been discovered that the addition of Epon™ 8111 and Epikure™ 3271 to the A- and B-side, respectively, results in a foam that raises rapidly and becomes tack-free or essentially tack-free an about 2 minutes or less. Also addition of acrylate monomers such as the MCure or SR products previously mentioned to the epoxy side and addition of Epikure3271 in side B can reduce the tack free time to less than 1 minute.

As used herein "tack-free" is a preliminary measure of cure state and a proxy measure for the resistance to sag that is desired of foams used in the building industry. As the polymer film forms and expands under the effect of the blowing agent, a skin forms on the outer surface. When this skin can be touched without any foam composition residue remaining on the finger it is said to be "tack-free." In general, the formation of such a tack-free skin within these times is consistent with the ability of a foam to resist the force of gravity long enough for the polymer structure to form and set to avoid running or sagging in the wall cavity. A further measure of the cure state is referred to as "resilient" or "cured throughout." This is a more fully cured state that allows a finger to depress the foam, and the foam will rebound back to essentially its original state. Spray foams of the invention generally are tack-free within 4 minutes, more typically within 2 minutes or one minute; and are resilient within about 20 minutes, more typically within about 15 or 10 minutes.

Although not wishing to be bound by theory, it is believed that an advantage of utilizing chemically generated heat (e.g., over externally applied heat) is that the reaction between the acrylate monomer moieties (e.g. MCure 400) and polyamine curing agents (e.g.Epikure™ 3271) provides the required heat for both the NIPU and HNIPU reactions. For example, it is believed that two reactions are sequentially taking place. These reactions are as follows:

1. acrylate monomer (such as Mcure 400 or SR399)+ polyamine (such as Epikure™ 3271)→heat and primary network structure
2. epoxy resin+NIPU+heat→more network structure and polymerization In reaction number "1", the reaction between acrylic functionalities and Epikure™ 3271, the amine functional group of the Epikure™ 3271 is added to the acrylic functional group by a Michael addition. This reaction is a fast, exothermic reaction which provides the primary network for the foam and which also generates the required heat for the reaction between the cyclocarbonate/amine and the epoxy/amine. Other compounds containing acrylic functional groups such as, but not limited to, SR 399, MCure 400, MCure 400Ep, MCure 202, SR 610, SR 492, SR 259, SR 248, SR 247, SR 214, and CD 9021 (all commercially available from Sartomer) can be used in place of Epon™ 8111. Additionally, amines such as triethylenetetramine (TETA), Ancamines® (Huntsman), and Jeffamines® (Huntsman) can be used in place of Epikure™ 3271.

Additionally, it is to be appreciated that the crosslinking is important for capturing the bubbles generated by the evolution of the gas in their original, fine structure before they can coalesce and escape the foam. A fine foam structure is more desirable and more beneficial than a coarse foam structure in order to achieve high thermal performance. Also, the crosslinking of the cyclocarbonates and/or the di- or poly epoxy resin with the amine builds strength in the foam and permits the foam to withstand the force of gravity when it is placed, for example, in a vertical wall cavity during application. The resulting resistance to heat transfer, or R-value, may be as from about 3.0 to about 7.0 per inch. It is also to be appreciated that the foam formed may have an open or closed cell structure and that the oligomer and ratio of cyclocarbonate functional groups to epoxy functional groups can be modified to result in a rigid or a flexible polyurethane foam and/or an open or closed foam.

In one exemplary embodiment of the invention, a phase change blowing agent is utilized as the blowing agent. To form a foam utilizing a phase change blowing agent such as a low boiling point hydrocarbon or inert gas, a compound (e.g., a monomer or an oligomer) having thereon at least one cyclocarbonate group and optionally a di- or poly epoxy resin, a di- or polyfunctional amine crosslinking agent, and phase change blowing agent are pressurized, such as in a pressurized spray-type container. Upon mixing the two sides, the amine cross linking agent reacts with the cyclocarbonate functionalities and/or the epoxy resin to form the polymer backbone, the blowing agent is released from the pressurized container (e.g., released into atmospheric pressure or depressurized), and the blowing agent changes from a liquid to a gas to initiate the foaming reaction to foam the polymer backbone. The foaming reaction continues until all of the blowing agent has been converted into a gas and all the amine groups have been reacted.

In yet another embodiment, a method of forming a non-isocyanate foam is provided that includes (1) delivering a first component that includes at least one urethane amine oligomer made by reacting a cyclocarbonate and a di- or -polyamine crosslinking agent as described above (i.e., made by a non-isocyanate reaction) through a first delivery line to an application device, (2) delivering a second component that includes a di- or poly epoxy resin to the application device, where one of the first and second components further includes a blowing agent, (3) mixing the first and second components within the application device to form a reaction mixture, and (4) permitting the amine and epoxy to chemically react while the blowing agent forms a gas to initiate a foaming reaction and form a foam. The first component may further include a first plasticizer and/or a surfactant and the second component may further include a second plasticizer and/or a non-reactive resin. In exemplary embodiments, a compound (e.g., a monomer or an oligomer) having thereon at least one cyclocarbonate group and an amine are pre-reacted to generate the urethane oligomer, which is then reacted with the di- or poly epoxy.

In use, the inventive foams may be sprayed into or onto a building's structural components. As used herein, "Structural components" of a building or building structure include, but are not limited to, wall studs, including king studs and cripple studs, sheathing, including foams, OSB, particleboard, plywood, Celotex™, Tyvek™ and the like, floor joists, bandjoists, subflooring, sole plates and top plates, headers, beams, rafters, trusses, windowframes, doorframes and the like—and to any cavity between any such structural component. Thus, foams may be sprayed into an open cavity, such as between wall studs, or into a closed cavity where it expands to seal any open spaces. The application is desirably a continuous spray process.

Alternatively, the foams may be applied in a manner to fill or substantially fill a mold or fed into an extruder or an injection molding apparatus, such as for reaction injection molding (RIM), and used to form items such as cushions, mattresses, pillows, and toys. For example, a compound (e.g., a monomer or an oligomer) having thereon at least one cyclocarbonate group, a polyfunctional amine crosslinking agent, and a blowing agent may be mixed and applied to a mold where the crosslinking agent reacts with the cyclocarbonate groups while the blowing agent degrades or reacts to form a gas and initiate the foaming reaction.

The foams of the present invention may be used to insulate buildings such as homes from temperature fluctuations outside of the building's envelope. In addition, the foams of the present invention are preferably non-structural foams. The foams may serve both as a conductive and a convective thermal barrier. The foams of the present invention may also serve as a sealant or barrier to air infiltration by filling cracks and/or crevices in a building's roof or walls. Additionally, the foams may be used to form a barrier to seal cracks or crevasses around doors, windows, electric boxes, and the like. Further, the foams can be used in other applications, such as, but not limited to, insulating household pipes, appliance insulation, and attic insulation.

Another advantage of the foams of the present invention is the safe installation of the foam into cavities. The foams do not release any harmful vapors into the air when applied or sprayed. Therefore, the inventive foams reduce the threat of harm to individuals working with or located near the foam. In addition, the application of the foams is more amenable to the installer as he/she will not need to wear a special breathing apparatus during installation.

Another advantage of the inventive foams is that it can be used in the renovation market, as well as in houses that are occupied by persons or animals. Existing, conventional spray polyurethane foams cannot be used in these applications because of the generation of high amounts of free isocyanate monomers that could adversely affect the occupants of the dwelling. As discussed above, exposure of isocyanate monomers may cause irritation to the nose, throat, and lungs, difficulty in breathing, skin irritation and/or blistering, and a sensitization of the airways.

It is further advantageous that the inclusion of the plasticizer in the B-side allows for the inclusion of other solid materials that may add functionality and/or cost savings to the final foamed product.

It is also an advantage of the present invention is that the components of the two-part foam compositions are carefully chosen to result in a tacky or sticky foam that can be used to hold the fiberglass batt in place when used to fill cracks or crevasses. Such tackiness is desirable when flash and batt systems are employed.

Having generally described this invention, a further understanding can be obtained by reference to certain specific examples illustrated below which are provided for purposes of illustration only and are not intended to be all inclusive or limiting unless otherwise specified.

EXAMPLES

Example 1

The components of Part A and Part B, indicated in Table 1, were mixed together in container and permitted to foam. The time from initial foaming to the time when the foam cured and became tack free was determined to be less than 2 minutes.

TABLE 1

Formulation 1

| | Tradename | Description | Gram (g) | Wt Pct (%) |
|---|---|---|---|---|
| Part A | DER331 | Epoxy resin | 53.12 | 45.73 |
| | Epon™ 8111 | multifunctional resin* | 18.98 | 16.34 |
| | NaOH (0.1N) | base | 0.76 | 0.65 |
| Part B | Cycloate A/ Ancamine 2678 | Preformed oligomer | 20.32 | 17.49 |
| | Epikure™ 3271 | excess polyamine | 4.74 | 4.08 |
| | HFC-245a | blowing agent | 12.24 | 10.53 |
| | DC193 | surfactant/plasiticizer | 5.89 | 5.07 |
| | Tint Ayd | dye | 0.1 | 0.09 |
| | | Total | 116.2 | 100.0 |

*multifunctional resin having both epoxy and unsaturation functionalities

Example 2

For each of formulations 2 and 3, the respective components of Part A and Part B, indicated in Table 2, were mixed together and sprayed on a vertical cavity using an Oaks mixer.

TABLE 2

Formulations 2 and 3

| | | | Formulation 2 | | Formulation 3 | |
|---|---|---|---|---|---|---|
| | Tradename | Description | Gram (g) | Pct (%) | Gram (g) | Pct (%) |
| Part A | | | | | | |
| | D.E.R 331 | Epoxy resin | 847.76 | 51.5% | 408.32 | 25.5% |
| | Mcure-400 | acrylate monomer | 163.14 | 9.9% | 480 | 30.0% |
| | FEA-1100 | blowing agent | 189.36 | 11.5% | 198.4 | 12.4% |
| | Garamite 1958 | rheology modifier | — | — | 32 | 2.0% |
| Part B | | | | | | |
| | Cycloate A/ Ancamine 2678 | Preformed oligomer* | 135.47 | 8.2% | 158.08 | 9.9% |
| | Ancamine 2678 | excess polyamine | 212.67 | 12.9% | — | — |
| | Epikure 3271 | excess polyamine | — | — | 196.8 | 12.3% |
| | Dabco PM 200 | nucleating agent | — | — | 8.64 | 0.5% |
| | DC 193 | surfactant/plasticizer | 97.59 | 5.9% | 104 | 6.5% |
| | Garamite 1958 | rheology modifier | — | — | 12.8 | 0.8% |
| | | Total | 1646.0 | 100% | 1599.0 | 100.0% |

Formulations 2 and 3 differ primarily in the percentage of MCure-400 as well as the absence or presence of Garamite 1958. Formulation 3, when sprayed on vertical surface, resulted in total dripping of liquid down the wall cavity (see FIG. 2A). In contrast, Formulation 3, when sprayed on vertical surface, resulted in a closed-cell foam that did not sag and stayed in place, (See FIG. 2B). This example illustrates the importance of the acrylate monomer and the rheology modifier.

Example 3

Four foam compositions are prepared according to the formulations 4, 5, 6 and 7 shown in Table 3 below. Formulations 4-7 differ from prior formulations in using a urethane arcylate oligomer, rather than a cyclocarbonate-amine preformed oligomer.

TABLE 3

Formulations 4 to 7

| | | | Formulation (weight percents) | | | |
|---|---|---|---|---|---|---|
| | Tradename | Description | No. 4 | No. 5 | No. 6 | No. 7 |
| Part A | | | | | | |
| | DER 331 | Epoxy resin | — | — | 29.15% | 21.59% |
| | Epon 828 | Epoxy resin | 28.77% | 27.86% | — | — |
| | CN9010 | Urethane Acrylate oligomer | 33.82% | 32.75% | 34.26% | — |
| | CN975 | Urethane Acrylate oligomer | — | — | — | 24.92% |
| | MCure 400 | Acrylate monomer | — | — | — | 16.61% |
| | Garamite 1958 | Rheology modifier | — | 2.19% | — | 1.69% |
| | FEA-1100 | Blowing agent | 14.66% | 14.19% | 14.85% | 13.29% |
| Part B | | | | | | |
| | Epikure 3271 | diamine | 13.53% | 13.10% | 13.70% | 16.61% |
| | Dabco PM 200 | nucleating agent | 0.61% | 0.59% | 0.62% | 0.42% |
| | DC 193 | surfactant/plasticizer | 7.33% | 7.94% | 7.42% | 0.71% |
| | Garamite 1958 | Rheology modifier | 1.29% | 1.39% | — | 4.15% |
| | | Total | 100.0% | 100.0% | 100.0% | 100.0% |

For each formulation, the two parts, A and B, were mixed together in a container, sprayed on a vertical cavity using a two-part epoxy mixer-gun and allowed to foam. Formulations #4 and #6, having no rheology modifier in Part A showed considerable dripping or sagging, whereas formulation #5 did not. Foams 4 and 5 both produced foams having greater than 80% closed cell; the closed cell content of formulation 6 was not determined. Formulation 7 provided a very rapid tack-free time of about 5 seconds, in a non-sagging foam.

The foregoing description of the various aspects and embodiments of the present invention has been presented for purposes of illustration and description. It is not intended to be exhaustive or all embodiments or to limit the invention to the specific aspects disclosed. Obvious modifications or variations are possible in light of the above teachings and such modifications and variations may well fall within the scope of the invention as determined by the appended claims when interpreted in accordance with the breadth to which they are fairly, legally and equitably entitled.

What is claimed is:

1. A two-part non-isocyanate polyurethane foam system with reduced harmful vapor emission comprising:
   a first part comprising:
      a urethane reactant comprising a preformed urethane prepolymer; and
      a resin polymer;
   a second part comprising:
      a cross-linker having at least two reactive functional groups adapted to be rapidly crosslinked with the reactive functional groups of the urethane reactant to form a hybrid polyurethane; and
      a blowing agent with at least one of zero ozone depletion potential or low global warming potential; and
   a rheology modifier provided in at least one of the first part and the second part, wherein upon formation, the foam composition releases substantially no isocyanate vapors.

2. The two-part non-isocyanate polyurethane foam system of claim 1, wherein the rheology modifier is selected from a clay-based rheology modifier and polymer microspheres.

3. The two-part non-isocyanate polyurethane foam system of claim 1, wherein the foam system further comprises at least one flame retardant.

4. The two-part non-isocyanate polyurethane foam system of claim 1, wherein the resin polymer is an epoxy resin.

5. The two-part non-isocyanate polyurethane foam system of claim 1, further comprising an acrylate monomer.

6. The two-part non-isocyanate polyurethane foam system of claim 1, wherein the urethane reactant is present in an amount of 25% to 40% by weight.

7. The two-part non-isocyanate polyurethane foam system of claim 1, wherein the cross-linker is present in an amount of 1% to 20% by weight.

8. The two-part non-isocyanate polyurethane foam system of claim 1, wherein the resin polymer is present in an amount of 10% to 60% by weight.

9. The two-part non-isocyanate polyurethane foam system of claim 1, wherein the blowing agent is at least partially contained within microspheres.

10. A two-part spray foam system for forming a hybrid non-isocyanate polyurethane foam, the foam system comprising:
    a first part comprising:
       a non-isocyanate polyurethane reactant comprising a preformed urethane prepolymer; and
       a resin polymer;
    a second part comprising:
       a cross-linker having at least two reactive functional groups adapted to be rapidly crosslinked with the reactive functional groups of the urethane reactant to form a hybrid polyurethane; and
       a blowing agent; and
    0.1% to 20% by weight of a rheology modifier provided in at least one of the first part and the second part, based on the weight of the hybrid non-isocyanate polyurethane foam.

11. The two-part spray foam system of claim 10, wherein the preformed urethane prepolymer is selected from a cyclocarbonate-amine adduct and a urethane acrylate oligomer.

12. The two-part spray foam system of claim 10, wherein the cross-linker is a polyamine.

13. The two-part spray foam system of claim 10, wherein the hybrid non-isocyanate polyurethane foam has an R-value of greater than 3.

14. The two-part spray foam system of claim 10, wherein the foam is tack-free in less than one minute after combining the first part and the second part.

15. A method of forming a non-structural, non-isocyanate foam with reduced harmful vapor emission from a two-part spray foam system, the method comprising:
    providing, in a first spray foam part, a urethane reactant comprising a cyclocarbonate-amine adduct and a resin polymer;
    providing, in a second spray foam part, a cross-linker having at least two reactive functional groups adapted to be rapidly crosslinked with the reactive functional groups of the urethane reactant to form a hybrid non-isocyanate polyurethane foam and a blowing agent;
    and a rheology modifier in at least one of the first spray foam part and the second spray foam part;
    mixing the first spray foam part and the second spray foam part;
    applying the non-structural foam to a substrate, wherein the foam is tack-free within two minutes after mixing and cures to form a non-structural, non-isocyanate foam having an R-value of greater than 3.

16. The method of claim 15, wherein the rheology modifier is selected form a clay-based rheology modifier and polymer microspheres.

17. The method of claim 15, wherein the foam further comprises at least one flame retardant.

* * * * *